July 22, 1952  O. E. KJELLBERG  2,604,000
LATHE STOP
Filed Jan. 10, 1949

INVENTOR.
OSCAR E. KJELLBERG
BY
Cook & Robinson
ATTORNEYS

Patented July 22, 1952

2,604,000

UNITED STATES PATENT OFFICE 2,604,000

LATHE STOP

Oscar E. Kjellberg, Seattle, Wash.

Application January 10, 1949, Serial No. 70,099

2 Claims. (Cl. 82—21)

This invention relates to improvements in devices which in the art to which they pertain are generally known as "lathe stops" or as "master stops" for lathes, and it is the principal object of the invention to provide a means, designed to be used in combination with master stops as generally used on present day lathes, to afford extreme accuracy in the final stopping position of the lathe carriage.

For a better understanding of the present invention and its mode of use, it will be here explained that the usual lathe stop comprises a power released bolt that is designed to be shifted from a "set" position to "off" position upon being engaged by a release member that is adjustably fixed to a part of the feed carriage of the lathe. Such bolts when so shifted disengage the driving clutch to automatically stop the lathe. The present day mechanisms provide, however, for the setting of the release member, for example, at intervals that are spaced one-tenth of an inch apart. In view of this, the release member is generally set to stop the machine at the even interval just short of final distance. Then if it is desired to continue the advancement of the carriage to an exact fractional distance of the interval of spacing, the operator manually shifts the driving clutch into engagement and causes the carriage to be advanced the desired distance as determined by taking trial measurements.

In view of the possibility of inaccuracy in so arriving at such measurements, and in view of the great loss of time due to such method or procedure, it has been the principal object of this invention to provide an attachment for use in combination with master stops of present day lathes whereby the exact distance of advancement after actuation of the master stop bolt by the release member may be visually observed, and the necessity of taking measurements by scale or otherwise is eliminated.

Further objects of my invention reside in the combination of parts employed for this purpose, in the relationship of parts, in their details of construction and in their mode of use as will hereinafter be fully described.

In accomplishing the above mentioned and other objects of the invention, I have provided the improved details of construction, the preferred forms of which are illustrated in the accompanying drawings, wherein.

Figure 1:
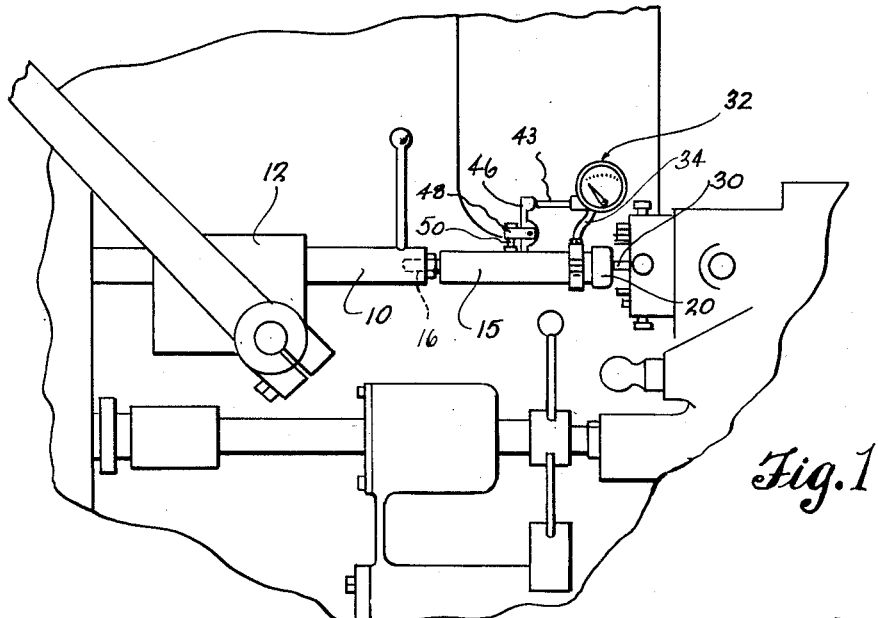
Fig. 1 is a side view of a portion of a common form of machine lathe, illustrating the use of a lathe stop combination therewith in accordance with the present invention.

Referring more in detail to the drawings:

In Fig. 1, which shows therein those certain parts of a common type of lathe that are concerned with this invention, 10 designates the power release bolt of the lathe; it being understood that if this bolt is "set" and is then caused to be engaged and shifted by contact therewith of a release member mounted on the lathe carriage, it will immediately throw the driving clutch from "on" to "off" and cause the lathe to be stopped, in so far as farther advance of the carriage is concerned. The bolt 10 is slidably mounted and is held axially parallel with the line of travel of the lathe carriage in a stationary supporting member designated in general by numeral 12.

The present invention contemplates the use, in combination with the bolt 10, of a bolt extension member in the form of a rigid metallic stem 15 that is equipped at one end with a threaded shank 16 whereby it may be fixedly mounted on the end of the bolt 10 in axial alignment therewith, as shown in Fig. 1. The stem 15 is formed with an axial bore or channel 17 extending through a substantial portion of its length. Slidably fitted in this channel is a plunger 18, formed at its outer end with an enlarged head 20. A screw 21 is fixed in the stem and passed diametrically through a longitudinal slot 22 in the plunger, which slot, by a determination of its length, definitely limits the inward and outward travel of the plunger 18 relative to the stem 15.

Figure 2:
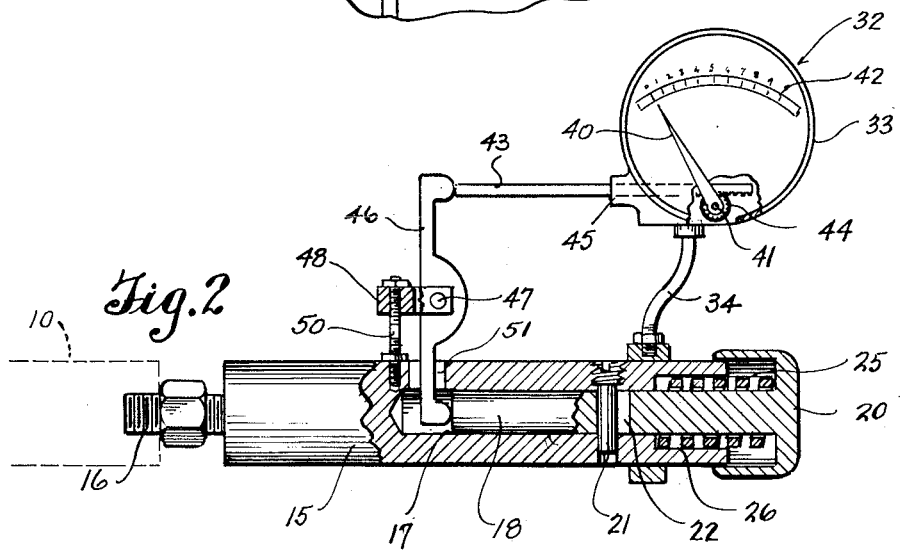
Fig. 2 is a side view of a master stop mechanism embodying the present invention; a part of the stop bolt attachment being shown in longitudinal section for better understanding.

As noted in Fig. 2, a coiled spring 25 is located about the outer end portion of the stem 18 between the head 20 and the base of a socket 26 formed in the adjacent end portion of the stem, and this spring is held thereby under such compression that the plunger will be normally held fully extended and the master stop may be actuated in the normal way by contact of the adjustable release member on the lathe carriage with the head. In Fig. 1 of the drawing, I have designated a release member at 30, and it is to be understood that this is only representative of release means of many and various kinds that might be employed and which might be set at definite release intervals.

Fixed rigidly upon the stem 15 is an indicator device designated in its entirety in Fig. 1 by reference character 32. This indicator comprises a housing 33 that is supported in fixed relationship to the stem 15 by a bracket 34. The indicator preferably is one of a well known type of indicator known as the "Starrett indicator," or something of a like kind. It comprises a movable pointer 40 fixed on a pivot shaft 41, to be moved thereby along a graduated scale on the dial 42. To actuate the pointer, there is provided a rack bar 43, operatively in mesh with a gear wheel 44 that is fixed on the shaft 41. The rack bar is movably mounted in a guide 45 formed as a part of the housing 33. At its outer end the rack is engaged by the outer end of a rocker lever 46. The lever 46 is pivotally mounted between its ends by a pivot member 47 held in a mounting block 48 that is adjustably fixed to the stem 15 by a screw 50. The inner end of the lever is extended through an opening 51 in the stem 15 and is there held engaged against the inner end of the plunger 18. The pointer 40 moves against spring pressure which retains the pointer actuating parts in proper relationship.

The indicator pointer normally reads at zero, and is not affected so long as the master stop bolt has not been actuated. However, as soon as the master stop is actuated by the contact of actuator 30 with head 20, the operator may then re-engage the driving clutch, and visually note the rate and distance of advancement of the carriage by watching the movement of the indicator hand 40 along the dial graduations. It will be understood that as the actuator 30 on the carriage advances, it causes the spring 25 to be compressed and the plunger 18 to be moved inwardly on stem 15. This movement causes lever 46 to actuate the rack 43 and the pointer to be moved accordingly. The dial preferably is graduated in thousandths of an inch. When the pointer reaches the mark that indicates the desired advancement of the lathe, the operator may then manually release the clutch to stop farther advancement.

Having thus described my invention, what I claim as new therein and desire to secure by Letters Patent is:

1. In a lathe of the character described, a lathe stop mechanism comprising, in combination, a master stop bolt, an actuator therefor that is movable with the lathe carriage to engage and trip the bolt, a stem fixed to the bolt as an extension thereof, a plunger extending from the end of the stem for direct contact by the actuator, for tripping the bolt, a spring maintaining pressure against the plunger to hold it extended with sufficient resistance for the tripping of the bolt by the actuator without permitting relative inward movement of the plunger in the stem, a carriage travel indicator mounted on the stem and means operable by relative inward movement of the plunger in the stem as effected by the actuator after the bolt is tripped to cause the indicator to show readings in accordance with the extent of advancement of the carriage.

2. In a lathe of the character described, the combination with a master stop bolt that can be moved to disengage the machine's driving clutch, and an actuator member movable with the lathe carriage to engage and actuate the stop bolt, of a contact member movably supported from the stop bolt for engagement by said actuator member, a spring interposed between the bolt and contact member and of such strength as to provide for the actuation of the stop bolt therethrough without being compressed, a carriage travel indicator fixed relative to the stop bolt and means operable by that movement of the said contact member after the stop has been actuated and which results in compression of the spring, to actuate the indicator in accordance in the carriage advancement.

OSCAR E. KJELLBERG.

REFERENCES CITED

The following references are of record in the file of this patent:

UNITED STATES PATENTS

| Number | Name | Date |
|---|---|---|
| 2,105,703 | Self | Jan. 18, 1938 |
| 2,173,009 | Cotal | Sept. 12, 1939 |
| 2,210,560 | Allen et al. | Aug. 6, 1940 |
| 2,368,408 | Brooking | Jan. 30, 1945 |
| 2,399,045 | Kylin | Apr. 23, 1946 |
| 2,506,236 | Overmyer | May 2, 1950 |

FOREIGN PATENTS

| Number | Country | Date |
|---|---|---|
| 579,346 | Germany | June 24, 1933 |